United States Patent
Hu et al.

(10) Patent No.: US 7,835,369 B2
(45) Date of Patent: Nov. 16, 2010

(54) DATA STREAM BONDING DEVICE AND METHOD FOR BONDING DATA STREAMS

(75) Inventors: Chung Feng Hu, Singapore (SG); Jia Xiang Shi, Singapore (SG); Ingo Volkening, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 907 days.

(21) Appl. No.: 11/527,974

(22) Filed: Sep. 27, 2006

(65) Prior Publication Data

US 2008/0075111 A1   Mar. 27, 2008

(51) Int. Cl.
*H04L 12/56* (2006.01)

(52) U.S. Cl. .................. 370/400; 370/394; 370/464

(58) Field of Classification Search .......... 370/537–541
See application file for complete search history.

(56) References Cited

U.S. PATENT DOCUMENTS

| | | | |
|---|---|---|---|
| 5,875,192 A | 2/1999 | Cam et al. | |
| 6,111,896 A * | 8/2000 | Slattery et al. | 370/535 |
| 6,198,749 B1 * | 3/2001 | Hui et al. | 370/463 |
| 6,717,960 B1 | 4/2004 | Anesko et al. | |
| 6,879,590 B2 * | 4/2005 | Pedersen et al. | 370/394 |
| 6,944,138 B1 | 9/2005 | Song | |
| 6,985,503 B1 | 1/2006 | DeGrandpre et al. | |
| 7,006,509 B1 * | 2/2006 | Jagannatharao et al. | 370/412 |
| 7,376,191 B2 * | 5/2008 | Melick et al. | 375/259 |
| 7,630,412 B2 * | 12/2009 | Wright et al. | 370/536 |
| 2002/0021661 A1 | 2/2002 | DeGrandpre et al. | |
| 2002/0181441 A1 | 12/2002 | De Paul | |
| 2003/0219019 A1 | 11/2003 | Wilson | |
| 2006/0098573 A1 * | 5/2006 | Beer et al. | 370/230 |

\* cited by examiner

*Primary Examiner*—Phuc Tran
(74) *Attorney, Agent, or Firm*—SpryIP, LLC (57) ABSTRACT

A data stream bonding device comprises a first unit to receive or transmit first data of a first data stream from a first communication link and a second unit to receive or transmit second data of a second data stream from a second communication link. A first interface is coupled to the first unit and a second interface is coupled to the second unit to establish a frame-based communication link between the first and second unit. A processor is provided to generate information related to bonding.

24 Claims, 9 Drawing Sheets

DATA STREAM BONDING DEVICE AND METHOD FOR BONDING DATA STREAMS

The present application relates to the field of bonding data streams.

SUMMARY

According to one aspect, an embodiment relates to a data stream bonding device. The data stream bonding device has a first unit to receive first data of a first data stream from a first telecommunication link and a second unit to receive second data of a second data stream from a second telecommunication link. A first interface is coupled to the first unit and a second interface is coupled to the second unit to establish a frame-based communication link between the first and second unit. A processor is provided to generate combining information based on the received first and second data and an aggregating machine is provided to receive the combining information and to combine the first and second data into a third data stream based on the combining information. A transmitter transmits the third data stream over a communication link.

According to another aspect, an embodiment relates to a data stream bonding method. At a first unit a first data stream with first data is received from a first telecommunication link. At a second unit a second data stream with second data is received from a second telecommunication link. The first data are transmitted over a frame-based link between the first unit and the second unit to a bonding processor and the second data are transmitted to the bonding processor. The first and second data are processed at the bonding processor to generate bonding information. A unified data stream including the first and second data is transmitted over a communication link coupled to the first unit in accordance with the bonding information.

DETAILED DESCRIPTION

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below.

Figure 1:
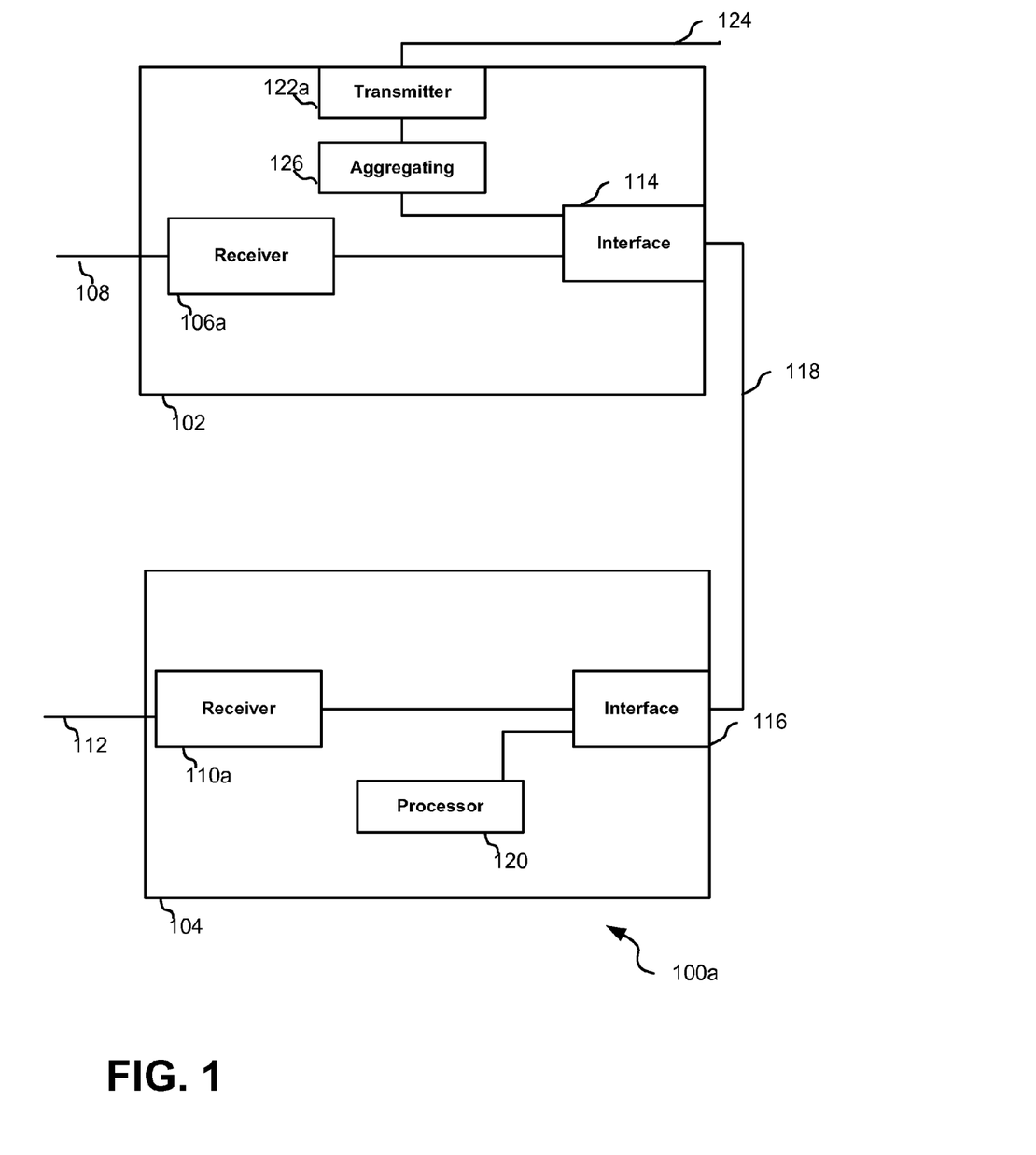
FIG. 1 shows a block diagram according to one embodiment of the present invention.

FIG. 1 shows a data stream bonding device 100a according to one embodiment of the present invention. Data stream bonding devices such as the data stream bonding device 100a are provided to allow transmission of a single or unified data stream over two or more different telecommunication links. Data stream bonding as provided in the embodiments as set forth below may be implemented in many ways, for example by inverse multiplexing for wired xDSL access communication links or wireless communication links. To give only one of many embodiments, bonding may be provided according to the af-phy-0086.001 standard for ATM data streams, also known as IMA (Inverse multiplexing over ATM). IMA may be provided for example within ADSL 2 or ADSL 2+ allowing to transceive, between a Central Office and a subscriber or a local area network, a single ATM data stream as a plurality of sub-data streams over a plurality of xDSL communication links such as two-wired copper lines.

Referring to FIG. 1, the data stream bonding device 100a comprises a first unit 102 and a second unit 104. The first unit 102 comprises according to one embodiment a first receiver 106a coupled to a first telecommunication link 108 for receiving a first data stream. Furthermore, the second unit 104 comprises a second receiver 110a coupled to a second telecommunication link 112 for receiving a second data stream from the second telecommunication link 112. The receivers 106a and 110a may be configured as circuits implementing lower protocol layer functions such as the PHY and Data link layer.

The first receiver 106a is coupled to a first interface 114 establishing a frame-based communication link 118 to a second interface 116 coupled to the second receiver 110a. A frame-based communication link is a communication link over which packets having a variable payload size are transmitted. Frame-based communication links are for example Ethernet links or Framerelay links.

A processor 120 for generating bonding information is coupled to the second interface 116. The processor may be a general processor having firmware or software adapted to allow the processor to function as a bonding processor. According to one embodiment, the processor may be a dedicated bonding processor. An aggregating machine for aggregating data of the first and second data stream into a unified data stream according to the combining information is coupled to the first interface 114. A transmitter 122a for transmitting the unified data stream to a data or system link 124 is coupled to the aggregating machine 126.

It is to be noted that receivers 106a and 110a may be implemented according to one embodiment as transceivers for receiving data from telecommunication links 108 and 112 as well as for transmitting data over telecommunication links 108 and 112. Furthermore, according to one embodiment, the aggregating machine is arranged in the second unit 104 and the unified data stream is transmitted over frame-based link 118 from the second unit to the first unit for transmitting the unified data stream over link 124. Furthermore, according to other embodiments, the transmitter 122a may be arranged outside of the first and second unit and may be coupled to the first and second unit by a communication link different from frame-based link 118.

According to one embodiment, unit 102 is implemented on a first chip, i.e. receiver 106a, transmitter 122a and first interface 114 are arranged on a same chip and unit 104 is implemented on a second chip, i.e. receiver 110a, processor 120 and second interface 116 are arranged on a same chip. In embodiments of the present invention, the first and second units 102 and 104 may be arranged within a housing or box of a single NBTBBA (Network Termination Broad band Access) such as a xDSL modem or a xDSL gateway router as well as within different housings or boxes of separate NBTBBAs such as xDSL-modems or xDSL-gateways routers.

According to one embodiment, units 102 and 104 are implemented on one single chip, i.e. receivers 106a and 110a, processor 120, transmitter 122a and interfaces 114 and 116 are arranged on a same chip.

The data communication links 108 and 112 shown in the embodiment according to FIG. 1 are configured according to one embodiment to be wired communication links such as a 2-wire copper line of a DSL-based data communication, for example ADSL, HDSL, VDSL. However, it is intended that in other embodiments data communication links 108 and 112 encompass other types of data communication links such as wireless communication links or fiber optic communication links. In other embodiments, the data communication links 108 and 112 may be of different type, for example, the data communication link 108 may be implemented as a 2-wire copper line while data communication link 112 may be implemented as a wireless communication link.

According to one embodiment, the data stream bonding device 100a is a CPE data stream bonding device, for example a NBTBBA (Network Termination Broad band Access) such as a modem or gateway. The NBTBBA is configured to receive data via transmission links 108 and 112 from a Central Office at a CPE (costumer premise equipment) side and to transmit the received data via system link 124 to a local home computer, a home office computer, a LAN (local area network) or other computers or networks at the CPE side.

Although receiver 110a and processor 120 are shown in FIG. 1 to be coupled only by interface 116, it is to be understood that receiver 110a and processor 120 may be coupled directly to each other. According to one embodiment, the direct coupling between receiver 110a and interface 116 is replaced by a coupling of receiver 110a to processor 120 establishing the coupling of the receiver 110a to the second interface 116 in combination with the coupling of processor 120 to interface 116.

Frame-based communication link 118 may be part of a frame-based communication network allowing the coupling of a plurality of units by connecting a plurality of interfaces to the frame-based communication link. The frame-based communication link includes according to one embodiment network devices such as switches, bridges or hubs. According to one embodiment, the data stream bonding device 100a is implemented as a distributed bonding system with a wide span.

Frame-based link 118 may comprise any know transport medium including cables, wires in combination with plug-in connectors for connecting separated boxes, as well as a wireless link or combinations of different transport mediums. According to one embodiment, the first and second units 102 and 104 are intended to be arranged on a same PCB (printed circuit board) and the frame-based link 118 is implemented by routing on the PCB.

It is to be understood that frame-based communication link may be a decentralized communication link having a distributed or decentralized control, i.e. no central control, a broadcast-based communication link wherein coordination of access to the link for packet broadcasts is distributed among the contending transmitting stations using controlled statistical arbitration or other implementations of frame-based communications. The frame-based communication link may be a switch-based communication link employing switching of frames to their destinations using address recognition.

According to one embodiment, the frame-based communication link is an Ethernet link and the first and second interfaces 114 and 116 are means for establishing Ethernet communication between the first and second units 102 and 104.

According to one embodiment, extension to bonding of more than two telecommunication links is intended by coupling one or more further units comprising a receiver and an interface to frame-based communication link 118. According to one embodiment, a system master-bonding master configuration may be extended to include further bonding slaves implementing PHY-layer functions for data streams received over telecommunication links coupled to the bonding slaves. The bonding slaves communicate data of the received data stream via frame-base link 118 to the bonding master and receive data via the frame-based link 118 for transmission over the telecommunication links.

According to one embodiment, communication over frame-based link comprises encapsulation of data packets within the frame. To this end, frame encapsulation machines are coupled to the interfaces 114 and 116 for encapsulating one or a plurality of data packets, for example ATM cells or EFM frames, or only parts of data packets, for example only overhead data such as data packet headers, within a data frame transmitted via frame-based communication link 118. According to one embodiment, the encapsulation machine comprises a look-up table assigning a plurality of reserved code values in a field of an Ethernet frame to information related to encapsulation of data into Ethernet packets and a frame processing machine to select a reserved code value from the plurality of reserved code values and to provide the selected reserved code value in the Ethernet frame.

According to one embodiment, the Ethernet encapsulation machines may be implemented to include FATE (Frame-based ATM Transport over Ethernet) functions. FATE is provided by the ATM forum standard to allow ATM services to be provided over Ethernet media. This is accomplished by transporting ATM data within an Ethernet frame and allows the benefits of ATM services to be provided by preserving ATM control mechanisms such as QoS, signaling and management. In this embodiment, Ethernet packets carrying a FATE UNI header and FATE payload are distinguished by the use of a new Ether type value placed in the type field. Packets carrying a FATE discovery message may also be distinguished by the use of a second new Ether type value placed in the type field. The FATE UNI header is identical to the first 4 octets of an ATM cell header. Hence, the FATE UNI header contains the GFC (Generic Flow Control), VPI (Virtual Path Identifier), VCI (Virtual Circuit Identifier), PT (Payload Type), and CLP (Cell Loss Priority) fields of the ATM cell structure. As with the FAST specification, the data payload size is variable. Selection of the FATE UNI size (link maximum fragment size) is impacted by the Maximum Transmission Unit (MTU) size of the Ethernet link, the transmission latency requirements of real-time services and limits by the FATE UNI Converter on the number of cells simultaneously undergoing reassembly. According to one embodiment, a FATE UNI Converter may limit the link's maximum fragment size to 48 bytes (of the AAL5 payload) per Ethernet frame. According to one embodiment, FATE may encapsulates ATM cells into Ethernet frame and utilize FATE Ethernet types 0x8884 for FATE Ethernet frames encapsulated ATM port 0 traffic and 0x884C for FATE Ethernet frames encapsulated ATM port 1 traffic.

According to one embodiment, the encapsulation machines are configured for encapsulation using an Ethernet Reserved Length Encapsulation. In this embodiment, codes of the length/type field which are reserved in the Ethernet standard family IEEE 802.3 are used by the encapsulation machines for indicating information within the Ethernet frame related to the encapsulation of one or multiple packets within the Ethernet frame. To be more specific, according to the IEEE Standard family 802.3, if the value of this field is less than or equal to 1500 (0x05DC), then the Length/Type field indicates length, i.e. the number of bytes in the subsequent MAC Client Data field of the Ethernet frame. If the value of this field is greater than or equal to 1536 (0x0600), then the Length/Type field indicates the nature of the MAC client protocol (protocol type).

Thus, the Ethernet standard length/type field assignment has a reserved space from 1501 (0x05DD) to 1535 (0x05FF). The reserved space is used according to one embodiment to indicate ATM/EFM over Ethernet encapsulation by assigning encapsulation information to the reserved codes. According to one embodiment, different codes are assigned for indication of different numbers of cells and ATM ports of the transmission. To give only one of may examples, assignment may be provided as set forth below:

0x05E0: one RAW ATM cell in one Ethernet frame

0x05E1: two RAW ATM cells in one Ethernet frame

0x05E2: three RAW ATM cells in one Ethernet frame

0x05E3: four RAW ATM cells in one Ethernet frame

It is to be noted that the achievable data rate is dependent on the number of ATM cells provided within one Ethernet frame. Over a 100 Mbps link (Mega Bits per second), the above four exemplary types of encapsulation achieve data rates including ATM header of 67.8 Mbps, 73.2 Mbps, 80.4 Mbps and 84.5 Mbps.

If two ports, for example ATM port 0 and ATM port 1, are used for transmission, the above assignment of the reserved space from 0x005E0 to E3 may be assigned to indicate port 0 traffic as outlined above, and in a corresponding manner, the codes 0x05E4 to 0x05E7 may be used to indicate port 1 traffic for the various numbers of cells provided in one Ethernet frame.

According to one embodiment, specific code symbols may be assigned to indicate port traffic. For example 0x05E0 may be assigned to RAW ATM port 0 traffic and 0x05E1 may be assigned to port 1 traffic, while other codes may be provided to indicate the number of cells within one Ethernet frame.

The number of cells within one Ethernet frame may be decided in an adaptive manner using for example software or firmware. If the other data traffic on the port is too low, a small number of cells may be encapsulated to avoid latency, while otherwise a higher number of cells may be encapsulated into one Ethernet frame in order to utilize the bandwidth. Thus, controlling means implemented in hardware, firmware, software or combinations thereof, for detecting the amount of traffic and selecting a number of cells to be encapsulated within the frame may be provided.

Figure 6A:
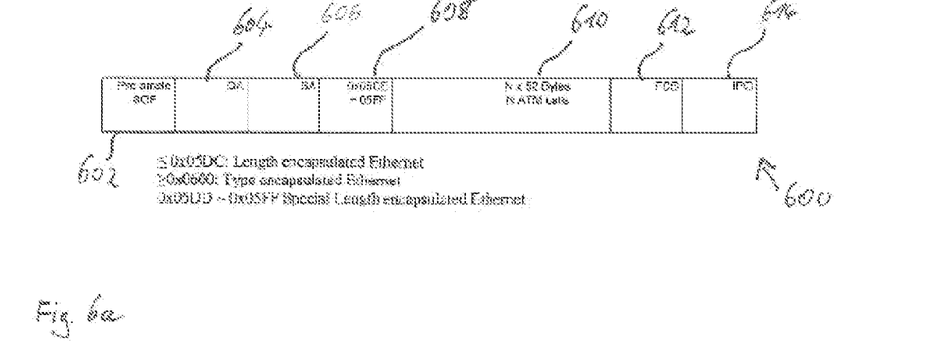
FIGS. 6a and 6b show a frame diagram according to embodiments of the present invention.

FIG. 6a shows an Ethernet frame 600 as may be used in the above described embodiment. The Ethernet frame comprises a Preamble field 602, a destination address field 604 and a source address field 606. Then follows the type/length field 608 comprising information regarding the encapsulation of data if one or more ATM cells are been encapsulated within the Ethernet frame. After the type/length field 608, data field 610 comprises the ATM cells encapsulated within the Ethernet frame. After the data field 610, a Frame Check Sum field (FCS field) 612 and an Inter Packet Gap field (IPG field) 614 are provided.

According to one embodiment, the encapsulation machine uses a VLAN TCI field (VLAN=Virtual Local Area Network, TCI=Tag Control Information) to provide information related to the encapsulation. To this end, an first and second encapsulation machines are coupled to the first and second interface, respectively, to encapsulate data into an Ethernet frame. According to one embodiment, the encapsulation machines comprise a look-up table assigning a plurality of bits of a TCI-field of an Ethernet frame to information related to encapsulation of data and a frame processing machine to select a bit value from the plurality of bits and to provide the selected bit value in the Ethernet frame.

VLAN TCI field has been provided in Ethernet Standards such as 802.1q and 802.1p in order to allow a general implementation of VLAN for switches. To each VLAN is assigned a VLAN ID for identification of the VLAN. In order to identify each VLAN, the Ethernet frame is extended by inserting 4 Bytes. The 4 Bytes comprise a TPID of 2 Bytes, having a fixed value of 0x8100 to indicate that the frame has 802.1q/802.1p-Tag information. Then follows 3 Bits of user priority, 1 Bit of CFI (Canonical Format Indicator) to indicate whether the format is canonical or non-canonical and 12 Bits for the VLAN ID. The 12 bits allow 4094 VLANS to be identified.

In typical networks such as for example SOHO (Small Office Home Office) networks, less or much less than 4094 VLANS are provided. According to one embodiment, a predetermined number n of the VLAN ID Bits is used instead of bits for indication of the VLANs for providing information related to the encapsulation of cells in the Ethernet frame, while m=12−n bits are provided for VLAN identification. For example, according to one embodiment, the last 2 Bits of the VLAN ID may be used to carry the encapsulation information. For example, bit 9 may be assigned to indicate ATM port traffic for 2 ports, and the last two bits, i.e. bits 10 and 11 may be used to indicate the number of cells within the Ethernet frame, for example 1 cell in one Ethernet frame, 2 cells in one Ethernet frame, four cells in one Ethernet frame, and eight cells in one Ethernet frame. According to one embodiment, only bit 11 may be used to indicate ATM port traffic. Furthermore, according to one embodiment, all 12 of the VLAN ID bits may be used to provide encapsulation information such as encapsulation type, traffic source, and ATM ports. In a similar manner to 3 VLAN bits indication coding, priority fields also can be used to indicate ATM port and the number of cells within one Ethernet frame.

Figure 6B:
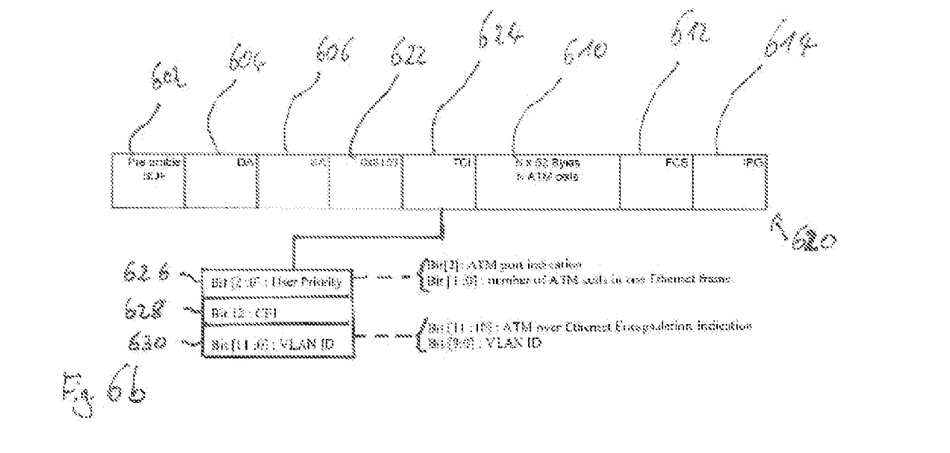

FIG. 6b shows an Ethernet frame 620 as provided according to one embodiment for ATM cell encapsulation using VLAN TCI encapsulation. As can be seen, the Ethernet frame 620 comprises the fields 602, 604, 606, 610, 612 and 614 described already with respect to FIG. 6a. Between the fields 606 and 610 is inserted TPID field 622 comprising the fixed value 0x8100 and TCI field 624. TCI field 624 comprises user priority bits 626, CFI Bit 628, and VLAN ID Bits 630. As shown in FIG. 6b, VLAN ID Bits 630 Bits 0 to 9 of the VLAN ID bits are reserved for VLAN Identification, whereas Bits 10 and 11 are reserved for providing information of the ATM over Ethernet Encapsulation Indication.

According to one embodiment, the Ethernet encapsulation machine uses UDP (User Datagram Protocol) destination port encapsulation as set forth below. Two specific UDP destination ports may be assigned, for example port 60000 for ATM port 0 and port 60001 for ATM port 1. In this embodiment, ATM cells are first encapsulated into IP/UDP packets. The IP/UDP packets are then encapsulated into an Ethernet frame for example using the length/type field to indicate the number of ATM cells inside one frame as outlined above. The encapsulation component may be a middle ware and on top of the MAC driver only. Thus, standard hardware/software components may be used without adaptation to provide the above encapsulation.

Although in the above embodiments the encapsulation machine has been described to implement only one of the above encapsulation methods, it is to be understood that according to one embodiment of the present invention, the encapsulation machine is capable of implementing more than one or all of the above encapsulation methods or other encapsulation methods. The encapsulation machine may select one of the multiple encapsulation methods upon parameters such as bandwidth or flexibility or upon a choice of the user.

Referring back to FIG. 1, unit 102 may be implemented according to one embodiment as a system master and unit 104 may be implemented as a bonding master. In this configuration, the task for generating the bonding information and the task of preparing and transferring the unified data stream to system link 124 according to the bonding information are separated, i.e. unit 102 performs system functions whereas unit 104 performs bonding functions. According to one embodiment, the aggregating machine comprises a second processor. Thus, at least two processors are provided for each of the separated task, i.e. the processor 120 for generating bonding information and the second processor for preparing the data for communication as a unified data stream over system link 124. According to one embodiment, the system master implements SAR (segmentation and aggregation) layer functions for ATM or EFM communication with system link 124.

Figure 2:
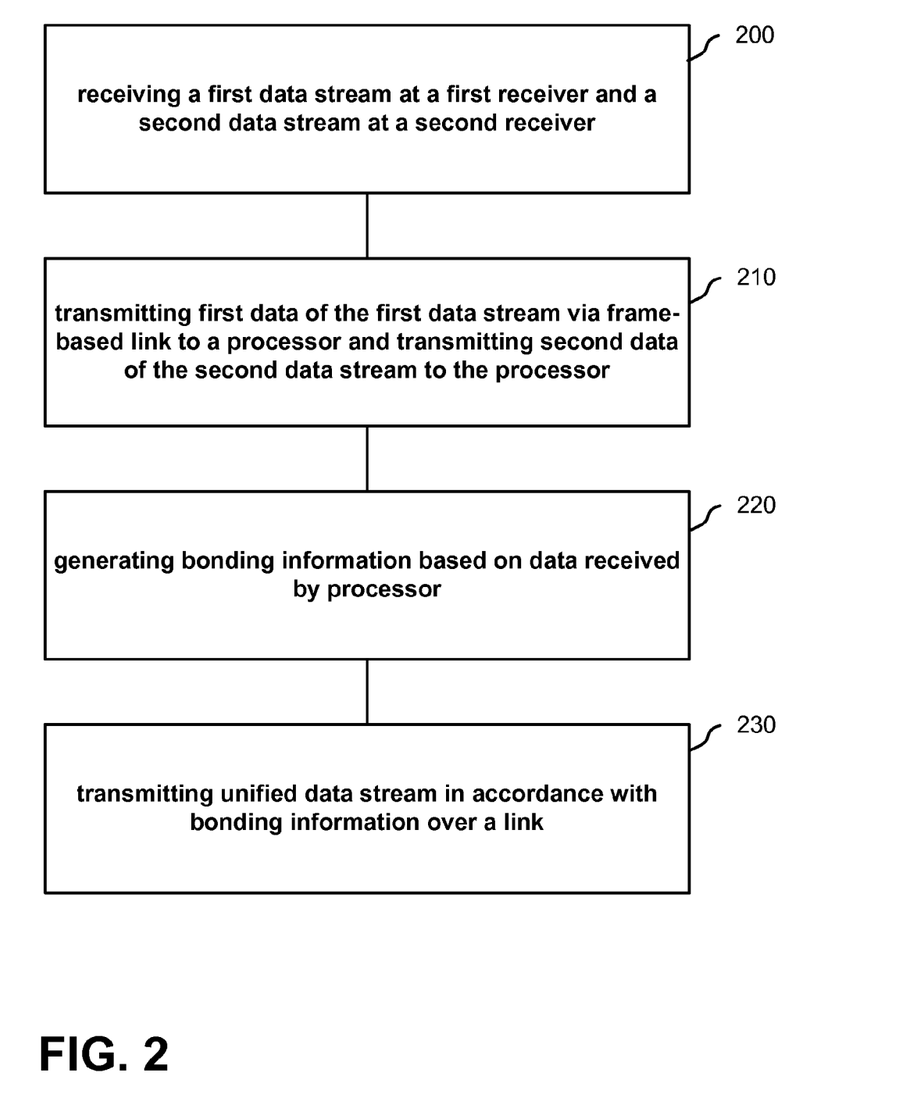
FIG. 2 shows a flow chart diagram according to one embodiment of the present invention.

Operation of the data stream bonding device 100a according to FIG. 1 will now be described with respect to FIG. 2. FIG. 2 is to be taken as an exemplary flow chart and other flow charts may be implemented in other embodiments of the present invention.

In a step 200, a first data stream is received at the first receiver 106a coupled to the first unit 102 and a second data stream is received at the second receiver 110a coupled to the second unit 104. In a step 210, first data of the first data stream are transmitted over the first interface from the first unit via the frame-based link to the processor 120 coupled to the second interface unit. Second data of the second data stream are transmitted from receiver 110a to processor 120.

According to one embodiment, the first and second data streams comprise data packets, for example cells or frames. According to one embodiment, the data packets received at the first unit 102 are transmitted by frame-based link 118 to the second unit 104 for processing by bonding processor 120.

According to one embodiment, only the headers of the data packets received at the first unit are transmitted over the frame-based link to the second unit while the payload data of the data packets are stored or intermediate stored at the first unit.

In a step 220, data received by the processor are processed to generate bonding information. According to one embodiment, header data of the data packets are processed by the bonding processor and are modified to comprise bonding information. Furthermore, the headers of the data packets received at the second unit are modified to comprise the bonding information.

According to one embodiment, the first and second data comprise ATM cells. According to one embodiment, ATM over xDSL is implemented by transmitting the ATM cells over xDSL lines. According to one embodiment, the ATM cells are modified before transmitting the ATM cells to processor 120. For example, header data which are no longer necessary for transmission may be removed prior to transmitting the ATM cells from receivers 106a and 110a to processor 120. In other embodiments, the first and second data received at receivers 106a and 110a comprises other types of data packets such as EFM-data packets. According to one embodiment, EFM over xDSL is implemented.

Receivers 106a and 110a may implement PHY-layer protocol routines in order to process the data stream received from communication links 108 and 112. For example, according to one embodiment, the receiver may implement PMD (physical medium dependent) layer functions as well as functions of the TC (transmission convergence) layer.

Then, in a step 230, a unified data stream comprising the first and second data is transmitted over link 124 coupled to the first unit in accordance with the bonding information.

Figure 3:
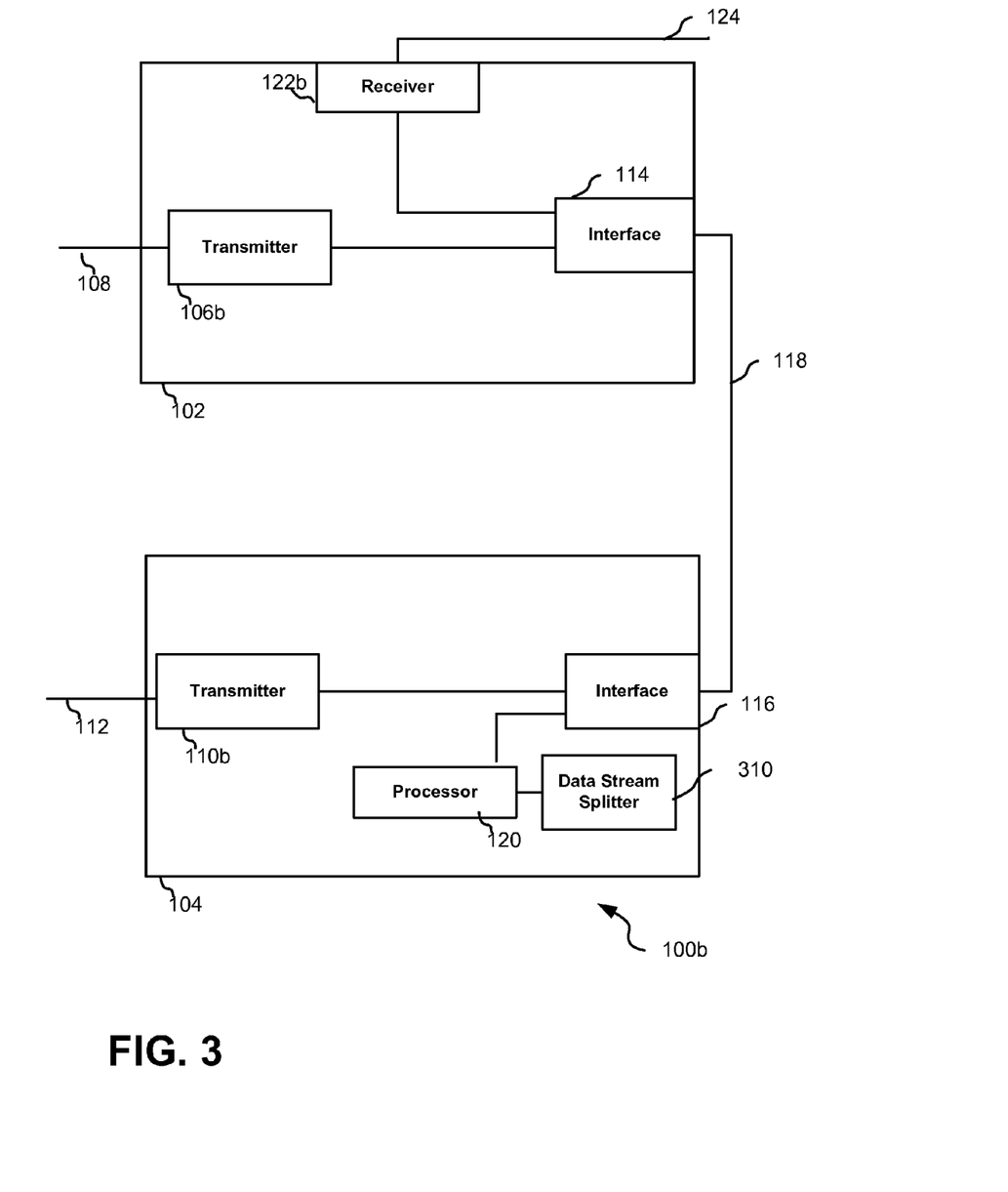
FIG. 3 shows a block diagram of a bonding device according to one embodiment of the present invention.

Referring now to FIG. 3, a further embodiment of the present invention will be described. FIG. 3 shows a data stream bonding device 100b comprising a receiver 122b to receive a data stream from system link 124. Receiver 122b is coupled to the first interface 114 coupled over frame-based link 118 to the second interface 116. Processor 120 is coupled to the second interface 116. First and second transmitters 106b and 110b for transmitting first and second data streams over telecommunication links 108 and 112 are coupled to the first and second interface, respectively. Furthermore, a data stream splitting machine 310 is coupled to the processor 120 to generate a first and second substream of the data stream received over system link 124 in accordance with information provided by processor 120. It is to be noted that data stream splitting machine may be implemented by hardware, software, firmware or combinations thereof. It is further to be noted that according to one embodiment, processor 120 and data stream splitting machine 310 may be combined, i.e. processor 120 implements data stream splitting functions based on instructions provided to the processor, for example by software firmware. While FIG. 3 shows the data stream splitting machine directly coupled to processor 120, it is to be understood that in other embodiments, indirect coupling may be provided for example by using the second interface 116 as coupling interface.

While data stream bonding device 100a implements an embodiment of the present invention for bonding in one communication direction, for example down stream communication, data stream bonding device 100b implements an embodiment of the present invention for bonding data streams in the other direction, for example upstream direction. Transmitters 106b and 110b may be configured to implement lower layer functions such as PHY layer and Data Link layer. Modifications and variations of the first and second units 102 and 104, the first and second interfaces 114 and 116 as well as the frame-based link 118 may be in accordance with modifications and variations of the embodiment described with respect to FIG. 1. Reference is made to the detailed description of these elements as described above with respect to FIG. 1.

Furthermore, it is to be noted that according to one embodiment of the present invention, receivers 106a and 110a of the embodiment according to FIG. 1 and transmitters 106b and 110b of the embodiment according to FIG. 3 may be combined to provide transceivers for communication with telecommunication links 108 and 112. Furthermore, receiver 122b and transmitter 122a may be combined to provide a transceiver for communication with system link 124. According to one embodiment, the aggregating machine 122a as well as the data splitting machine 310 may be provided to implement data stream bonding in upstream as well as in downstream direction.

Figure 4:
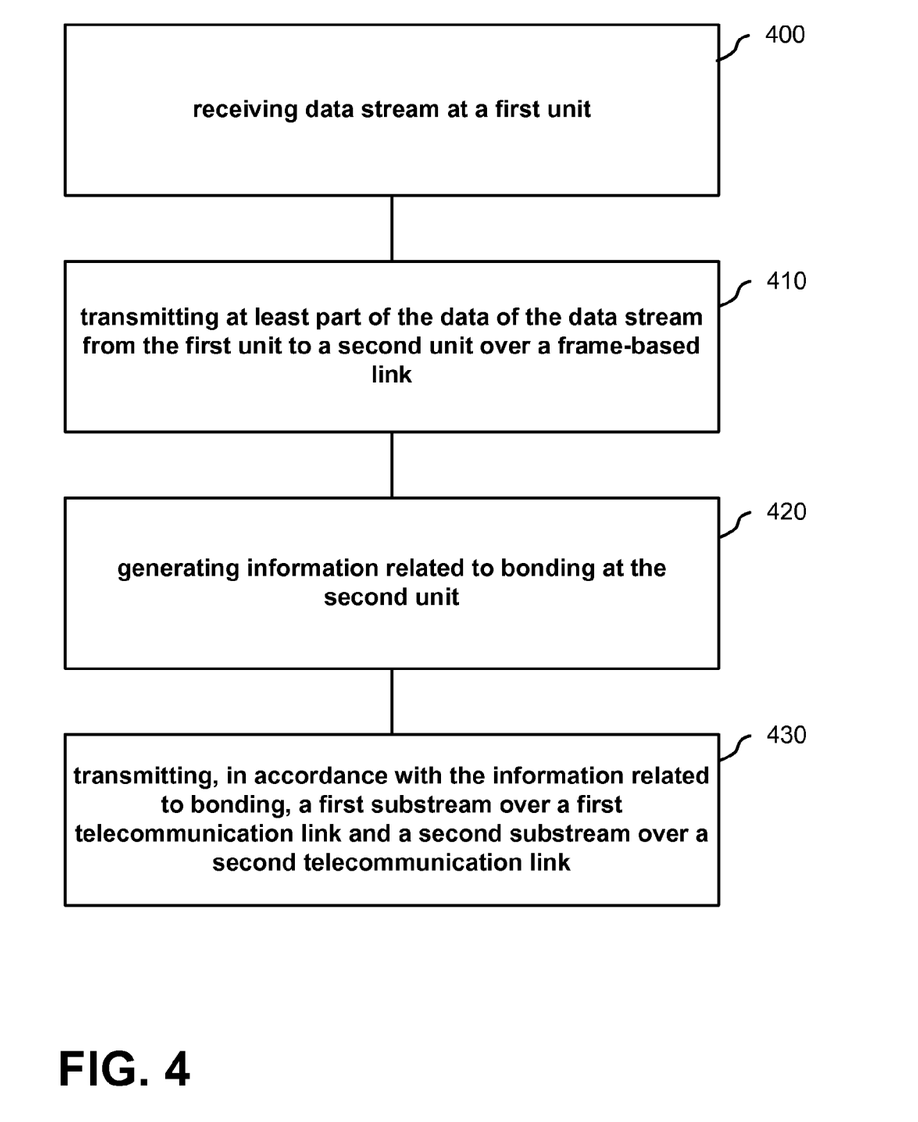
FIG. 4 shows a flow chart diagram according to one embodiment of the present invention.

The operation of data stream bonding device 100b will be described now with respect to FIG. 4.

In a step 400, a data stream from system communication link is received at the transceiver 122. Data of the data stream are transmitted to the first interface 114. It is to be noted that in embodiments of the present invention, only a part of all of the data of the data stream received from communication is transmitted to the first interface 114.

In a step 410, at least part of the data is transmitted over the frame-base link 118 from the first unit to a second unit.

In step 420, information related to the bonding of the telecommunication links 108 and 112 are generated at the second unit. The information may be information for splitting a plurality of data packets, for example a plurality of cells, into a first and second group and assigning a first and second transmission sequence to the first and second group. As described above, the information may be generated by bonding processor 120 based on the data transmitted over the frame-based link.

In a step 430, a first substream comprising first data of the data stream is transmitted over a first telecommunication link coupled to the first unit and a second substream comprising second data of the data stream is transmitted over a second telecommunication link coupled to the second unit, in accordance with the bonding information. In other words, the data stream received at the first unit is splitted according to the bonding information. According to one embodiment, the data of the data stream received at the first unit are a plurality of data packets and the plurality of data packets is split in a first group of data packets transmitted over the first telecommunication link and a second group of data packets transmitted over the second telecommunication link in accordance with the bonding information. The first and second group may comprise one or a plurality of data packets. According to one embodiment, the data packets are modified after receiving at the first unit and prior to transmitting same over the first and second telecommunication links. According to one embodiment, the at least part of the data transmitted over the frame-based link include the first and second group of data packets. According to one embodiment, the first group of data is transmitted back from the second unit to the first unit via the frame-based link after the bonding processor 120 has generated the bonding information. The first and second group of data packets may be modified to include the bonding information after same is generated by bonding processor 120.

Figure 5:
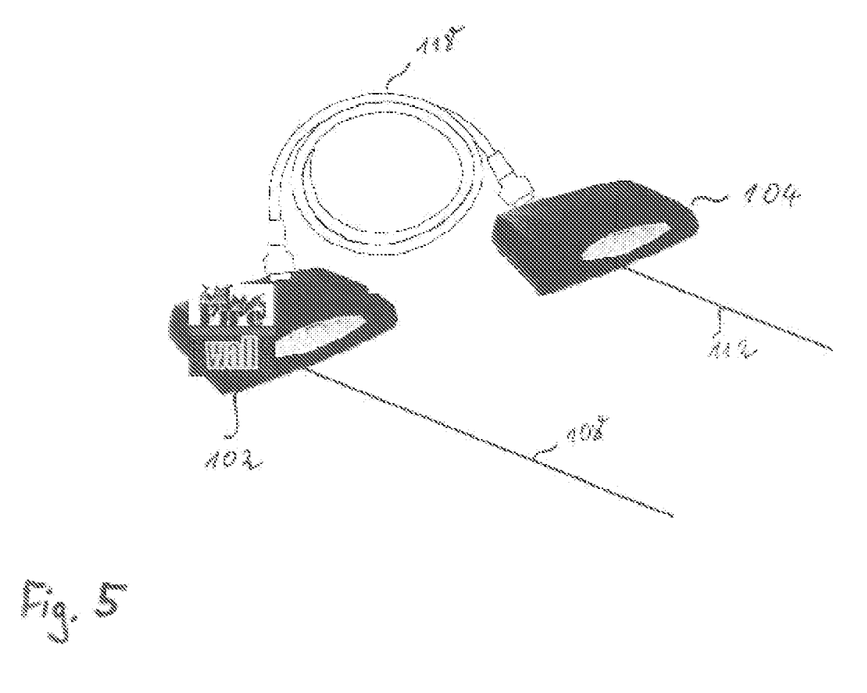
FIG. 5 shows a diagram of one embodiment of the present invention.

FIG. 5 shows one exemplary embodiment wherein the first unit 102 is implemented as an xDSL gateway which may include a firewall and the second unit 104 is a xDSL modem. The frame-based communication link 118 includes in this embodiment a connector for plugging in an Ethernet cable for connecting the first and second units via the Ethernet cable. As the distributed bonding device according to FIG. 5 provides the communication link 118 with a decentralized control such as the Ethernet, extension to bonding of more than two telecommunication links 102 and 104 is possible by connecting a further modem or gateway to the Ethernet link 118 established between first and second unit, thereby establishing a decentralized Ethernet network. As outlined above, the units 102 and 104 comprise in this embodiment transceivers for transceiving data over telecommunication links 108 and 112.

Figure 7:
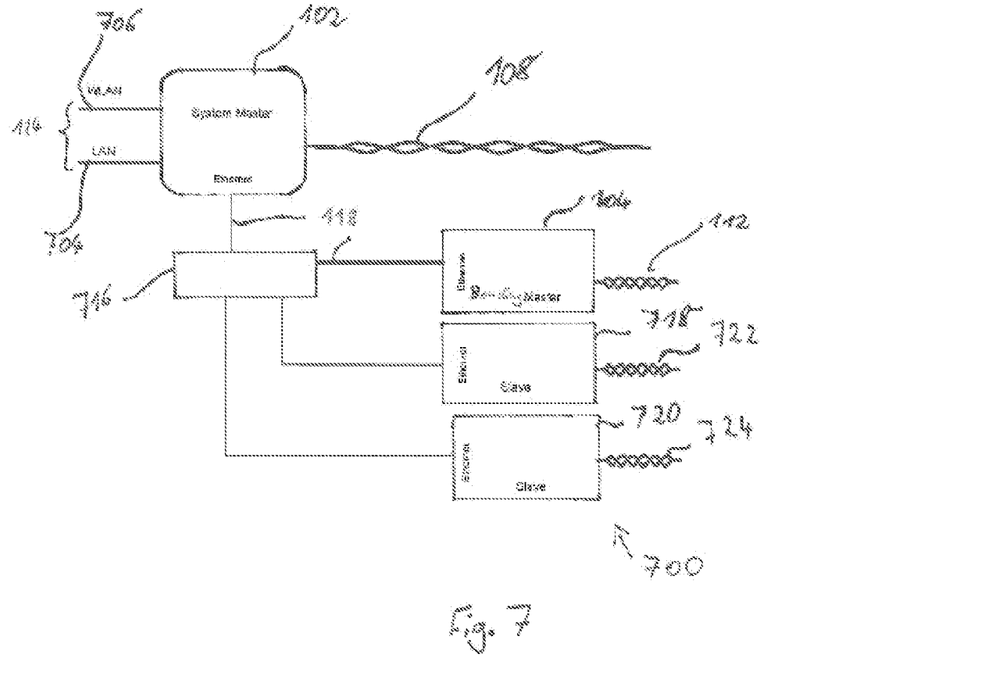
FIG. 7 shows a block diagram of a bonding device according to one embodiment of the present invention.

Referring now to FIG. 7, an embodiment of a bonding device 700 is shown wherein the first unit 102 is a system master and the second unit 104 is a bonding master. The System Master is connected to a system network such as a LAN or a WLAN by a system link 124 comprising LAN 704 link and WLAN 706 link. Although FIG. 7 shows the System master connected to a LAN and a WLAN, it is to be understood that in other embodiments the System Master may be connected only to a LAN or only to a WLAN. Furthermore, in other embodiments, other system connection to other system networks is encompassed.

In the embodiment according to FIG. 7, the frame-based link 118 is an Ethernet link. The first and second telecommunication links are 2-wire copper lines suitable for xDSL or other telecommunication. The first unit, i.e. the system master 102 is implemented to transceive xDSL data over the first telecommunication line 108 while the second unit 104, i.e. the bonding master is implemented to transceive xDSL data of a second data stream over telecommunication link 112. According to one embodiment, the xDSL link is an ADSL link. The bonding master may implement IMA+ or IMA bonding.

The Ethernet link comprises an Ethernet switch 716 for switching Ethernet frames transmitted over Ethernet link 118. While the embodiment according to FIG. 7 shows a switch, it is to be understood that in other embodiments the switch may be replaced by a bridge, a router or other types of switching units. It is further to be noted, that Ethernet link 118 between System Master 702 and Bonding Master 710 may in other embodiments not comprise switching, routing or bridging elements.

In the embodiment according to FIG. 7, a third unit implemented as bonding slave 718 and a fourth unit implemented as a bonding slave 720 are further connected to Ethernet switch 716. Thus, an Ethernet network system is formed among the units 702, 710, 718 and 720 comprising Ethernet switch 716 as switching unit. The first slave 718 is connected to a third telecommunication link 722 and the second slave 720 is connected to a fourth telecommunication link 724.

The number of system masters, bonding masters and bonding slaves provided in the bonding device is not limited to the configuration shown in FIG. 7 and may be varied, for example according to specific requirements of the system or choice of the user. According to one embodiment, no bonding slaves are provided, such that the bonding device comprises only a System Master and a Bonding Master 712. In other embodiments, only a System Master and one or more bonding slaves may be provided.

Figure 8:
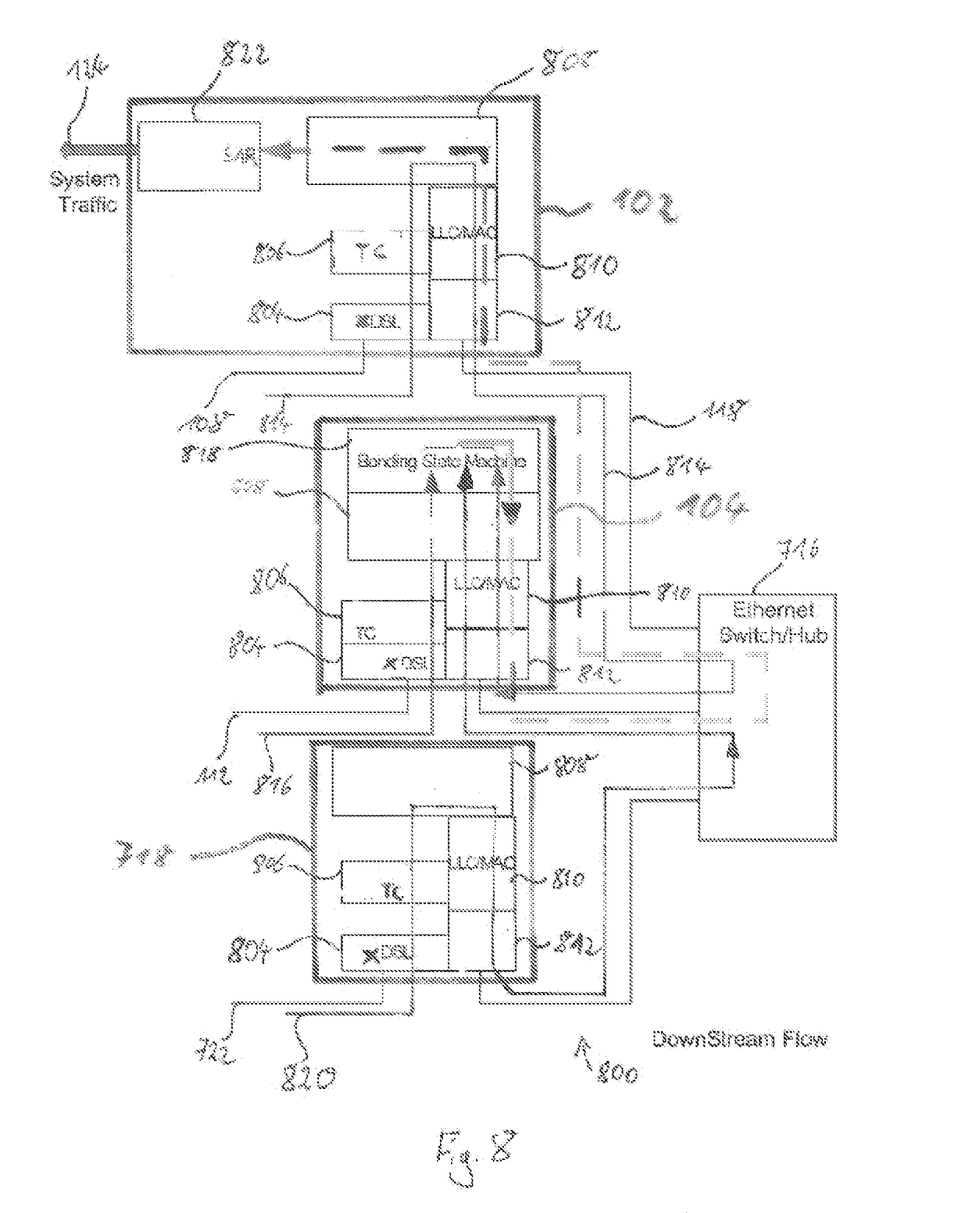
FIG. 8 shows a block diagram of a bonding device according to one embodiment of the present invention.

FIG. 8 shows a downstream path for an embodiment of a bonding device 800 having a configuration of three units. To be more specific, the bonding device according to FIG. 8 is implemented for xDSL bonding such as for example IMA or IMA+ and comprises the first unit 102 implemented as a system master, the second unit 104 implemented as a bonding master and the third unit 718 implemented as a bonding slave.

The bonding device according to FIG. 8 is a CPE bonding device for implementing bonding at the CPE side of a xDSL system. However, other embodiments may encompass for example a CO bonding device for providing bonding implementation at the CO side of a xDSL communication system.

For receiving data over telecommunication links 108, 112, and 722, each of the first, second and third units 102, 104 and 722 implements a lowest PHY-sublayer block 804, i.e. PMD (physical medium dependent) sublayer and the second PHY-sublayer block 806, i.e. a TC sublayer. According to one embodiment, TC sublayer 806 is an ATM or EFM TC-sublayer while other embodiments may include other TC sublayers depending on the protocol used for transmission.

Each of units 102, 104 and 718 further comprises an Ethernet encapsulation block 808 for implementing encapsulation of ATM cells or EFM frames into an Ethernet frame trans-mitted over the Ethernet link 118 coupling the units 102, 104 and 718. According to one embodiment, the Ethernet encapsulation block 808 is implemented for ATM over Ethernet encapsulation or EFM over Ethernet encapsulation.

For communication over Ethernet link 118, each of the units 102, 104 and 718 comprise a data link layer block 810 divided into a LLC sublayer block and a MAC sublayer block as provided in the various standards of the IEEE 802 family and a PHY layer block 812. According to one embodiment, the Ethernet comprises a 10 or 100 Base-T PHY-layer. However, other PHY layers such as Base-S, Base-F or Base-B may be provided in other embodiments.

In contrast to the units 102 and 718, the second unit 104 implemented as a bonding master further comprises a bonding state machine layer block 818 on top of block 808 for generating bonding information. This layer may implement various control functions for bonding such as modifying data headers of cells or packets of the multiple data streams and preparing them for aggregating to a single data stream. The bonding state machine layer block 818 as well as layers 804, 806, 808, 810 or 812 may be implemented in hardware, software, firmware or combinations thereof.

Describing now downstream operation, a data stream 814 received at unit 102 is passed through PMD sublayer block 804 and TC sublayer block 806. For communication over frame-based link 118 implemented in this embodiment as an Ethernet link, data stream 814 passes ATM/EFM over Ethernet encapsulation layer block 808, data link layer block 810 and PHY-layer block 812. After passing the above protocol layers, data stream 814 is transmitted via Ethernet switch 716 to the second unit 104, i.e. to the bonding master for generating bonding information based on data received with data stream 814. It is to be noted, that according to one embodiment, only a part of the received data stream 814 is transmitted to the bonding master. For example, according to one embodiment, the first data stream comprises first overhead data and first payload data, only the first overhead data is transmitted via frame-based link from the first unit to the second unit.

According to one embodiment, only the headers of received ATM cells or the overhead of received EFM frames is transmitted over link 118 to the second unit. In this embodiment, payload data of the data stream 814 are stored in a memory of the first unit.

The data stream 814 is received at the second unit and passes layer blocks 812, 810 and 808 of the second unit to be finally received at bonding state machine layer block 818. A second data stream 816 transmitted over second telecommunication link 112 is received at the second unit and passes layer blocks 804, 806 and 808. After passing layer block 808, the data of the data stream 816 are passed over to bonding state machine layer block 818. As described above, according to one embodiment, only a part of the received data stream 816 may be passed to bonding state machine layer block 818 while other data may be directly transmitted to the first unit. For example, according to one embodiment, only the headers of received ATM cells or the overhead of received EFM frames may be trans-mitted to bonding state machine layer block 818. Other data of the data stream 814 may be directly transmitted via Ethernet switch 716 to the first unit and stored at the first unit until further processing for transmission over system traffic as set forth below.

Furthermore, a third data stream 820 transmitted over third telecommunication link 722 is received at the third unit. The third data stream passes through PMD sublayer block 804 and TC sublayer block 806 Ethernet encapsulation layer block 808, data link layer block 810 and PHY-layer block 812 for transmitting the third data stream 820 via Ethernet switch 716 to the second unit 104 for generating bonding information based on data received with data stream 820. As described above, according to one embodiment, only a part of the received data stream 820 is transmitted to the bonding master. For example, according to one embodiment, only the headers of received ATM cells or the overhead of received EFM frames is transmitted over frame-based link 118 to the second unit. Other data of the data stream 814 may be directly transmitted via Ethernet switch 716 to the first unit and stored at the first unit until further processing for transmission over system traffic as set forth below.

After receiving the data from the first, second and third data stream, the bonding state machine layer processes the data to generate bonding or combining information used in a combining process to generate a unified data stream. The bonding state machine layer may for example modify the header data of received ATM cells or EFM packets. According to one embodiment, the data received at the bonding state machine layer block 818 may be processed to provide a unified data stream at the bonding state machine layer block 818 by aggregating the data of the first, second and third data stream using the bonding information.

The unified data stream is then transmitted via Ethernet switch 716 from the second unit to a SAR layer 822 at the first unit by passing through blocks 808, 810 and 812 of the second unit and blocks 812, 810 an 808 of the first unit. The SAR layer block 822 provides Segmentation And Reassembling functions for preparing the transmission of the unified data stream over system link 124. According to one embodiment, the SAR layer block 822 provides ATM or EFM SAR functions to implement ATM/EFM Segmentation and Reassembling functions.

According to one embodiment, only the bonding information or modified headers including the bonding information are transmitted via Ethernet switch 716 to the first unit and are used for processing the payload data of the first, second and third data stream to generate the unified data stream at the first unit, i.e. at the system master. As described above, in this embodiment, part of the data of the first, second and third data stream may be stored at the first unit until processing. Similar to the embodiment described above, the SAR layer block 822 may be used for implementing transmission over system link 124.

Figure 9:
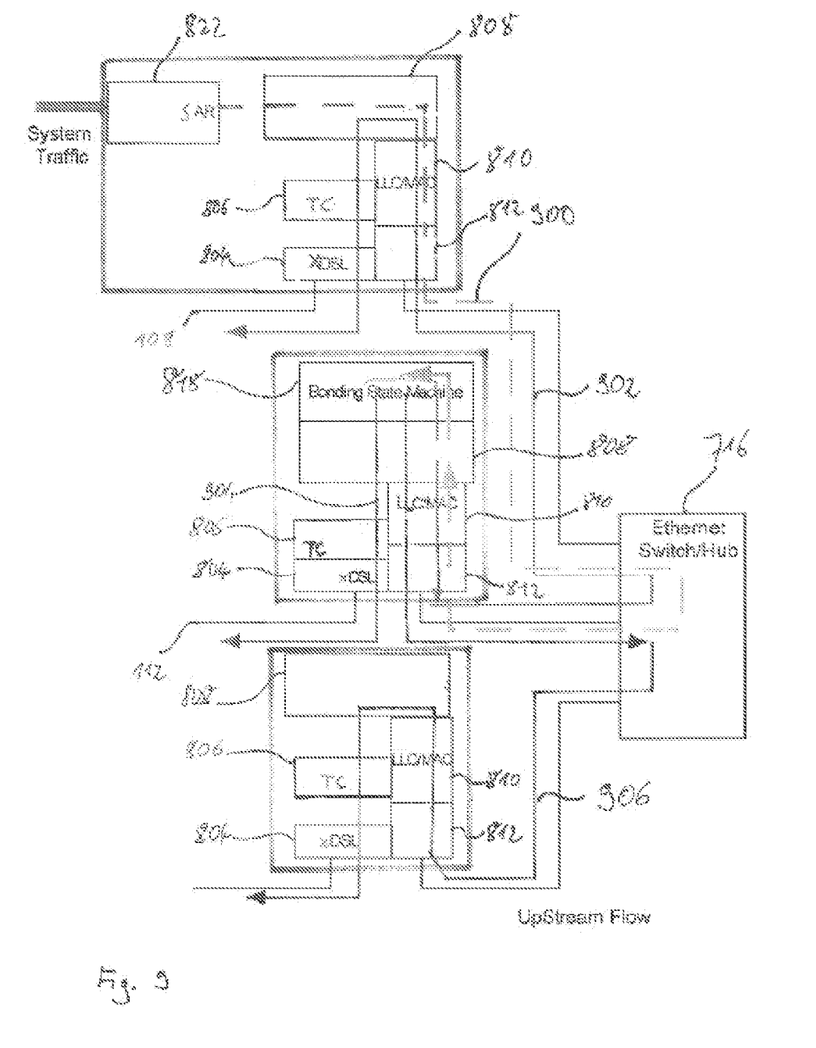
FIG. 9 shows a block diagram of a bonding device according to one embodiment of the present invention.

While having described with respect to FIG. 8 bonding for data transmitted in downstream direction, FIG. 9 refers now to bonding in upstream direction.

With reference to FIG. 9, a system data stream is received at the SAR layer block 822 of the first unit and trans-mitted after passing the SAR layer block as a data stream 900 to the bonding state machine layer block 818 of the second unit while passing through layer blocks 808, 810, 812 of the first unit and layer blocks 812, 810 and 808 of the second unit. At the bonding state machine layer block 818, bonding information is generated based on the received data of data stream 900. The data stream 900 is split in a first data substream 902, a second data substream 904 and a third data substream 906 based on the bonding information. The first data substream 902 is transmitted via Ethernet switch 716 to the first unit and is transmitted over the first telecommunication link by passing through layer blocks 808, 810 and 812 at the second unit and 812, 810, 808, 806 and 804 at the first unit.

The second data substream 904 is transmitted over the second telecommunication link 112 after passing through the layer blocks 806 and 804 at the second unit.

The third data substream is transmitted over the third telecommunication link 722 after passing through layer blocks 808, 810, 812 at the second unit and layer blocks 812, 810.

It is to be understood that various variations and modifications of the above described embodiments are possible. For example, various types of encapsulation may be used for communication on frame-based link as described with respect to FIG. 1 or various configurations may be implemented including configurations with only one or more system masters and one or more bonding masters, configurations with only one or more system masters and one or more bonding slaves and configurations with one or more system masters, one or more bonding masters and one or more bonding slaves. Moreover the first and second unit and third unit may be arranged on a single chip, may be arranged on a single circuit board or may be arranged in separated units, for example in different housings of modems. Moreover, the various function blocks of embodiments of the present invention may be implemented in hardware, software, firmware or variations thereof. In addition, wired as well as wireless telecommunication links may be encompassed by embodiments of the present invention. For transmission on the telecommunication links various types or protocols may be used. For example, according to one embodiment, encapsulation of frames or cells for transmission over the xDSL links such as ATM over DSL or EFM over DSL may be used.

It is further to be understood that in embodiments of the present invention any direct connection or coupling between two points, functional blocks, devices or other physical or functional units shown or described in the following detailed description of exemplary embodiments may be implemented in other embodiments by indirect connection or coupling. Vice versa, any indirect coupling or connection may be implemented on other embodiments by direct coupling or connection.

What is claimed is:

1. A data stream bonding device comprising:
 a first modem to receive first data of a first data stream from a first telecommunication link;
 a second modem to receive second data of a second data stream from a second telecommunication link;
 a first interface coupled to the first modem and a second interface coupled to the second modem to establish a frame-based communication link between the first and second modem;
 a processor to generate combining information based on the received first and second data, the processor being a functional unit of the first modem;
 an aggregating machine to receive the combining information and to combine the first and second data into a third data stream based on the combining information, the aggregating machine being a functional unit of the second modem; and
 a transmitter to transmit the third data stream over a communication link.

2. The data stream bonding device according to claim 1, wherein the frame-based communication link is an Ethernet link.

3. The data stream bonding device according to claim 1, wherein the first and second modem are separated units.

4. The data stream bonding device according to claim 1, wherein the frame-based communication link is a link of a decentralized network.

5. The data stream bonding device according to claim 1, wherein the first data stream comprises first overhead data and first payload data and wherein the first modem transmits the first overhead data via the frame-based link from the first interface to the second interface.

6. The data stream bonding device according to claim 1, wherein the aggregating machine is arranged in the first modem.

7. The data stream bonding device according to claim 6, wherein the transmitter is arranged in the first modem and coupled to the aggregating machine.

8. The data stream bonding device according to claim 1, wherein the transmitter is coupled to the frame-based communication link.

9. The data stream bonding device according to claim 1, wherein the first interface is arranged within the first modem and the second interface is arranged within the second modem.

10. The data stream bonding device according to claim 1, wherein the first and second telecommunication links are xDSL communication links.

11. The data stream bonding device according to claim 1, wherein the first and second data streams comprise ATM cells.

12. The data stream bonding device according to claim 1, wherein the first and second data streams comprise EFM data packets.

13. The data stream bonding device according to claim 1, wherein an encapsulation machine is coupled to the first and second Ethernet interface to encapsulate data into an Ethernet frame, the encapsulation machine comprising a logic to assign a plurality of reserved code values in a field of an Ethernet frame to information related to encapsulation of data into Ethernet packets and a frame processing machine to select a reserved code value from the plurality of reserved code values and to provide the selected reserved code value in the Ethernet frame.

14. The data stream bonding device according to claim 13, wherein the Ethernet field is the length/type field.

15. The data stream bonding device according to claim 1, wherein a first encapsulation machine is coupled to the first and a second encapsulation machine is coupled to the second interface to encapsulate data into an Ethernet frame, the first and second encapsulation machines comprising a look-up table assigning a plurality of bits of a TCI-field of an Ethernet frame to information related to encapsulation of data and a frame processing machine to select a bit value from the plurality of bits and to provide the selected bit value in the Ethernet frame.

16. A data stream bonding device comprising:
 a first unit to receive first data of a first data stream from a first telecommunication link;
 a second unit to receive second data of a second data stream from a second telecommunication link;
 a first interface coupled to the first unit and a second interface coupled to the second unit to establish an Ethernet link between the first and second unit;
 a processor to generate combining information based on the received first and second data;
 an aggregating machine to receive the combining information and to combine the first and second data into a third data stream based on the combining information; and
 a transmitter to transmit the third data stream over a communication link, wherein the first data stream comprises first overhead data and first payload data, and wherein the first unit transmits only the first overhead data via the Ethernet link from the first interface to the second interface.

17. A data stream bonding device comprising:
 a first unit to receive first data of a first data stream from a first telecommunication link;
 a second unit to receive second data of a second data stream from a second telecommunication link;

a first interface coupled to the first unit and a second interface coupled to the second unit to establish an Ethernet link between the first and second unit;

a processor to generate combining information based on the received first and second data, the processor being a functional unit of the first unit;

an aggregating machine to receive the combining information and to combine the first and second data into a third data stream based on the combining information, the aggregating machine being a functional unit of the second unit; and a transmitter to transmit the third data stream over a communication link, wherein the first data stream comprises first overhead data and first payload data, and wherein the first unit transmits the first overhead data and the first payload data via the Ethernet link from the first interface to the second interface.

18. A data stream bonding method comprising:

receiving at a first modem a first data stream comprising first data over a first telecommunication link;

receiving at a second modem a second data stream comprising second data over a second telecommunication link;

encapsulating at least the first data into an Ethernet frame to generate a first Ethernet frame, the act of encapsulation including:

assigning a plurality of reserved code values in a field of an Ethernet frame to information related to encapsulation of data into Ethernet packets;

selecting a reserved code value from the plurality of reserved code values; and providing the selected reserved code value in the first Ethernet frame;

transmitting the encapsulated first data over a frame-based link between the first modem and the second modem to a bonding processor and transmitting the second data to the bonding processor;

processing the first and second data at the bonding processor to generate bonding information; and transmitting a unified data stream comprising the first and second data over a communication link coupled to the first unit in accordance with the bonding information.

19. The method according to claim 18, wherein the first and second modems are separated units.

20. The method according to claim 19, further comprising transmitting first overhead data of the first data via the frame-based link from the first unit to the second modem.

21. The method according to claim 19, wherein the first data comprises first overhead data and the second data comprises second overhead data, further comprising:

transmitting only the first overhead data of the first data via the frame-based link from the first modem to the second modem;

generating combining information based on the first overhead data and second overhead data of the second data; and aggregating the first and second data based on the combining information.

22. The method according to claim 19, wherein the first data comprises first overhead data and first payload data, further comprising:

transmitting the first overhead data of the first data and the first payload data of the first data via the frame-based link from the first modem to the second modem.

23. The method according to claim 19, wherein the first and second telecommunication links are xDSL communication links.

24. A data stream bonding method comprising:

receiving at a first modem a first data stream comprising first data over a first telecommunication link;

receiving at a second modem a second data stream comprising second data over a second telecommunication link;

encapsulating at least the first data into an Ethernet frame to generate a first Ethernet frame, the act of encapsulation including:

assigning a plurality of bits of a TCI-field of an Ethernet frame to information related to encapsulation of data; and selecting a bit value from the plurality of bits to provide the information assigned to the selected bit value in the first Ethernet frame;

transmitting the encapsulated first data over a frame-based link between the first modem and the second modem to a bonding processor and transmitting the second data to the bonding processor;

processing the first and second data at the bonding processor to generate bonding information; and transmitting a unified data stream comprising the first and second data over a communication link coupled to the first unit in accordance with the bonding information.

* * * * *